United States Patent [19]

Arenhold

[11] 3,929,352

[45] Dec. 30, 1975

[54] SPLASH GUARD

[76] Inventor: Knut Arenhold, Birkenweg 5, 764 Kehl, Germany

[22] Filed: Aug. 19, 1974

[21] Appl. No.: 498,274

[30] Foreign Application Priority Data

June 18, 1974 Germany............................ 2429467
Aug. 22, 1973 Germany...................... 7330563[U]

[52] U.S. Cl.......................................... 280/154.5 R
[51] Int. Cl.²......................................... B62D 25/16
[58] Field of Search................ 280/154.5 R, 152 R; 298/1 SG

[56] References Cited
UNITED STATES PATENTS

| | | | |
|---|---|---|---|
| 2,714,015 | 7/1955 | Sherman...................... | 280/154.5 R |
| 2,865,654 | 12/1958 | Le Compte.................. | 280/154.5 R |
| 3,279,818 | 10/1966 | Jones............................ | 280/154.5 R |
| 3,285,624 | 11/1966 | Aber et al.................... | 280/154.5 R |
| 3,632,137 | 1/1972 | Jossy........................... | 280/154.5 R |

*Primary Examiner*—Leo Friaglia
*Assistant Examiner*—Michael J. Forman
*Attorney, Agent, or Firm*—Brumbaugh, Graves, Donohue & Raymond

[57] ABSTRACT

A splash guard for a vehicle comprises a generally rectangular sheet of material adapted for mounting adjacent its top edge on a vehicle behind a wheel of the vehicle so that one face of the sheet is presented to the wheel. At least one continuous, upstanding transverse rib is formed on the face of the sheet presented to the vehicle wheel. The rib extends diagonally across the sheet and is preferably curved along its length, having a curvature that decreases from the upper end of the transverse rib to the lower end. An upstanding longitudinal rib is also formed on the face of the sheet presented to the wheel and extends along the side of the sheet adjacent the end of the transverse rib which has the greater curvature. The sheet is mounted on a vehicle so that the longitudinal rib is located on the outermost side of the sheet relative to the vehicle.

3 Claims, 1 Drawing Figure

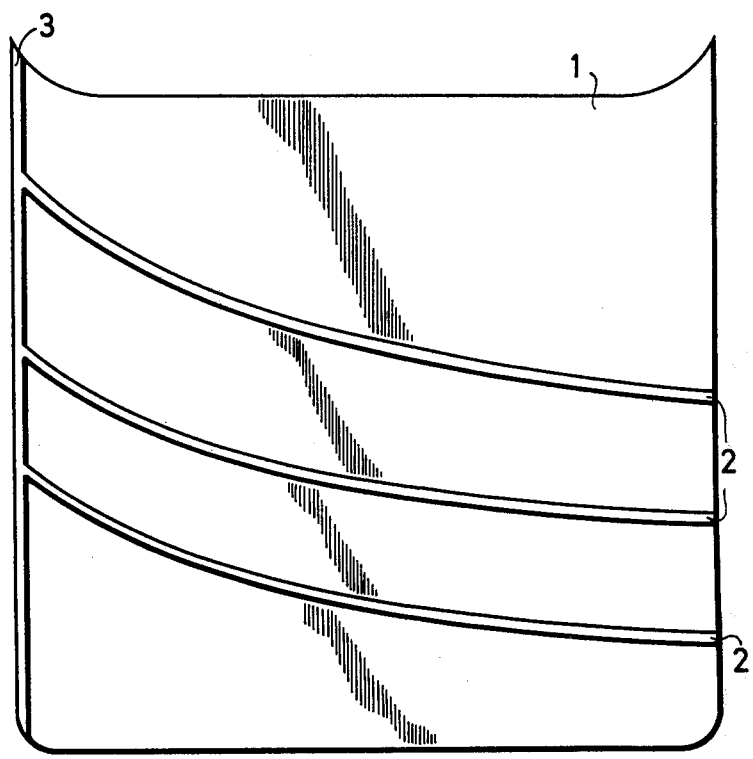

SPLASH GUARD

BACKGROUND OF THE INVENTION

It has long been recognized that increased safety in vehicular traffic is achieved, particularly in adverse weather conditions, by the use of splash guards or mud flaps mounted on vehicles behind their wheels. Splash guards deflect water, mud and slush thrown up by the wheels of a vehicle and help prevent such materials from being thrown onto the windshield of a following vehicle and obscuring the vision of the driver of the following vehicle. Splash guards are most advantageously used in conjunction with the rear wheels of a vehicle and are particularly desirable for trucks because truck bodies are mounted considerably higher off the road than the bodies of passenger automobiles. Without splash guards, the likelihood that material thrown up by the rear wheels of a truck will strike the windshield of a passenger automobile following the truck is significantly increased.

Sherman U.S. Pat. No. 2,714,015 describes and illustrates a flexible splash guard or mud flap that has two opposed sets of diagonal ribs formed on the face of the splash guard presented to the wheels of a vehicle. The ribs of each set are inclined downwardly from an outer edge of the splash guard so that water and other materials striking the splash guard are guided from the sides of the guard down the ribs to a clear zone in the center of the guard. A longitudinal rib is formed adjacent each side edge of the splash guard to prevent water from being thrown laterally outwardly from the splash guard. The effectiveness of the flexible splash guard of the sherman patent is substantially reduced, however, when a vehicle equipped with the patented splash guard is in motion, because of the strong current of air produced by the moving vehicle. The air current causes the water that is draining from the bottom of the guard to be thrown over the bottom edge of the guard and towards the rear of the vehicle, thereby substantially nullifying one of the desirable functions of the splash guard.

The operational problems of the Sherman splash guard have been recognized and to solve them, a splash guard has been proposed having a groove along the bottom edge of the guard. The groove extends from the outer side edge of the splash guard, as mounted on a vehicle, and opens at the inner side edge of the guard. The groove drains the water received from the upper portions of the splash guard towards the inside or center of the vehicle. The water is thereby removed from the region of the vehicle wheel and is conveyed under the body of the vehicle where there is a lesser possibility of the water being whirled up behind the vehicle by the air currents produced by the vehicle when it is moving.

The proposed splash guard having a groove or channel, however, also has a relatively high production cost, which consequently reduces the likelihood that the splash guard will be purchased and used. In addition, the groove or channel only conducts away such water as reaches the bottom edge of the splash guard, while large quantities of water and dirt can still be flung over the side edges of the splash guard towards the outside of the guard. There is also a substantial risk that the channel or groove will become clogged with dirt and no longer fulfill its intended function.

SUMMARY OF THE INVENTION

The present invention is directed to a splash guard for a vehicle which is constructed to prevent water and dirt from being flung outwardly of the vehicle and to direct water and dirt thrown against the guard toward and under the vehicle body. According to the invention, a splash guard for a vehicle wheel comprises a sheet of material having a top edge, a bottom edge and two laterally spaced side edges. The sheet is mounted adjacent its top edge on a vehicle behind a wheel of the vehicle so that one face of the sheet is presented to the wheel. On its face presented to the wheel, the sheet has at least one continuous upstanding transverse rib that extends from one side edge of the sheet to the other side edge of the sheet. The rib is inclined so that one end of the rib is closer to the bottom edge of the sheet than the other end of the rib. Thus, when the splash guard is properly mounted on a vehicle, the transverse rib (or ribs) guides water and dirt thrown up against the splash guard away from the air flow generated by the adjacent wheel of the vehicle and underneath the body of the vehicle, where there is less likelihood that the water and dirt will be flung rearwardly of the vehicle.

To prevent water and dirt from being thrown over one side of the splash guard, the sheet also has on its face presented to the vehicle wheel an upstanding longitudinal rib. The longitudinal rib extends along a side edge of the sheet adjacent the end of the transverse rib which is farther from the bottom edge of the sheet. When the splash guard is mounted on a vehicle, the longitudinal rib is located on the outermost side edge of the sheet relative to the vehicle.

In a preferred embodiment, the transverse rib (or ribs) is curved along its length. The curvature of the rib is smaller adjacent the end of the rib closer to the bottom of the sheet than adjacent the end of the rib farther from the bottom of the sheet. The splash guard is mounted on a vehicle so that the end of the rib having the lesser curvature is more nearly horizontal than the other end of the rib. As a result of the construction and mounting of the splash guard, water at the outer edge of the sheet drains quickly toward the inner edge of the sheet and, when it reaches the inner edge of the sheet, is directed underneath the body of the vehicle at the smallest possible angle from the horizontal.

BRIEF DESCRIPTION OF THE DRAWING

For a better understanding of the invention, reference may be made to the following description of an exemplary embodiment, taken in conjunction with the accompanying drawing, which is a plan view of one face of a splash guard according to the invention.

DESCRIPTION OF AN EMBODIMENT

The drawing illustrates one face of a splash guard 1 for a wheel of a motor vehicle. The splash guard 1 shown in the drawing is fabricated of a sheet of rubber, although the guard may be fabricated of any rigid or nonrigid material. The splash guard 1 may be fastened to the motor vehicle in any conventional manner. Extending across the illustrated face of the splash guard 1 are three upstanding transverse ribs 2. The transverse ribs 2 are continuous from one side edge of the splash guard 1 to the other side edge of the splash guard and are inclined so that they slope from left to right as viewed in the drawing. The transverse ribs 2 direct water and other material thrown up against the splash guard 1 toward the underside of the body of the vehicle on which the splash guard is mounted. Accordingly, the splash guard 1 illustrated in the drawing is mounted on a vehicle with its ribbed face presented to a wheel of the vehicle and with its left-hand side edge, as viewed in the drawing, adjacent the outer edge of the vehicle.

The transverse ribs 2 are slightly curved and each rib has a greater curvature adjacent its left-hand end than adjacent its right-hand end. The right-hand ends of the transverse ribs 2 are also more nearly horizontal than the left-hand ends of the ribs. The curvature of the transverse ribs 2 helps prevent dirt and water from being flung over the outer edge of the splash guard 1 and also helps the water to drain towards the inside or center of the vehicle on which the splash guard is mounted so that the dirt and water are flung underneath the vehicle body at a relatively small angle to the horizontal.

To enhance the effectiveness of the splash guard 1 in preventing water and dirt from being flung over the outer side edge of the splash guard, an upstanding longitudinal rib 3 is also formed on the face of the guard presented to a vehicle wheel, adjacent the outer edge of the guard. The longitudinal rib 3 is connected with each transverse rib 2 in order to eliminate any free passageway between the longitudinal rib and the transverse ribs through which water could flow vertically down the length of the splash guard 1. Both the longitudinal rib 3 and the transverse ribs 2 also reinforce the rubber sheet defining the main body of the splash guard.

It will be understood that the embodiment described above is merely exemplary and that persons skilled in the art may make many variations and modifications without departing from the spirit and scope of the invention. For example, the upstanding ribs 2 and 3 of the splash guard 1 illustrated in the drawings are all formed in one piece with the main rubber sheet forming the splash guard 1, but the ribs 2 and 3 could be fabricated separately and secured to the sheet. In addition, the number of transverse ribs 2 could be increased or decreased to any desired number. All such modifications and variations are intended to be within the scope of the invention as defined in the appended claims.

I claim:

1. A splash guard for a vehicle wheel comprising:
   a sheet of material having a top edge, a bottom edge, and two laterally spaced side edges, the sheet being adapted for mounting adjacent its top edge on a vehicle behind a wheel of the vehicle so that one face of the sheet is presented to the wheel;
   at least one continuous transverse rib projecting from said one face of the sheet and extending from one side edge of the sheet to the other side edge of the sheet, the transverse rib being curved along its length and inclined so that it is closer to the top edge of the sheet at the outermost side edge of the sheet, relative to the vehicle, than it is at the innermost side edge, the curvature of the transverse rib being larger adjacent the outermost side edge of the sheet than adjacent the innermost side edge so that the end of the transverse rib adjacent the innermost side edge of the sheet is more nearly horizontal, relative to the vehicle, than the end adjacent the outermost edge; and
   a longitudinal rib connected to the transverse rib and projecting from said one face of the sheet and extending along the outermost side edge of the sheet.

2. A splash guard according to claim 1, wherein the sheet and at least one of the ribs are part of a one-piece member.

3. A splash guard according to claim 1, wherein the sheet and all of the ribs are parts of a one-piece member.

* * * * *